United States Patent [19]
Baker et al.

[11] Patent Number: 5,430,634
[45] Date of Patent: Jul. 4, 1995

[54] CONCENTRATING AND COLLECTING OPTICAL SYSTEM USING CONCAVE TOROIDAL REFLECTORS

[75] Inventors: Glenn Baker; Karlheinz Strobl; Douglas Brenner, all of Los Angeles; Robert L. Piccioni, Thousand Oak; Robert Fischer, Westlake Village, all of Calif.; Michael Thomas, Brookline, Mass.

[73] Assignee: Cogent Light Technologies, Inc., Santa Clarita, Calif.

[21] Appl. No.: 924,198

[22] Filed: Aug. 3, 1992

[51] Int. Cl.6 .............................. F21V 8/00; F21V 7/04
[52] U.S. Cl. ...................................... 362/32; 362/298; 362/347; 359/858
[58] Field of Search ................. 362/32, 297, 298, 299, 362/263, 346, 347; 359/858, 861, 869

[56] References Cited

U.S. PATENT DOCUMENTS

| | | |
|---|---|---|
| 2,628,533 | 2/1953 | Oetjen . |
| 2,825,260 | 3/1958 | O'Brien .................................. 362/32 |
| 3,122,330 | 2/1964 | Trentini . |
| 3,476,930 | 11/1969 | Herman et al. . |
| 3,712,979 | 1/1973 | Padgitt . |
| 3,798,441 | 3/1974 | Wilson . |
| 4,241,390 | 12/1980 | Markle et al. ....................... 362/299 |
| 4,396,285 | 8/1983 | Presta et al. ........................ 356/138 |
| 4,706,168 | 11/1987 | Weisner . |
| 4,897,771 | 1/1990 | Parker . |
| 4,947,305 | 8/1990 | Gunter, Jr. ........................... 362/346 |
| 5,009,493 | 4/1991 | Koch et al. .......................... 359/858 |
| 5,042,892 | 8/1991 | Chiu et al. ........................... 362/32 |
| 5,058,985 | 10/1991 | Davenport et al. ................... 362/32 |
| 5,097,396 | 3/1992 | Myers .................................. 362/32 |

FOREIGN PATENT DOCUMENTS

| | | | |
|---|---|---|---|
| 182115 | 5/1986 | European Pat. Off. ............. 362/297 |
| 2441860 | 6/1980 | France . |
| 2159940 | 12/1985 | United Kingdom . |
| 2840692 | 1/1985 | U.S.S.R. . |
| 1254405 | 8/1986 | U.S.S.R. ............................. 359/858 |

OTHER PUBLICATIONS

*Communications Architecture for Multiprocessor Networks*, Nowatzyk, G., Ph.D. dissertation, Carnegie Mellon University, 1989. (see chapter 3).

Mertz, L., "*Configuration for a Large Light Collector,*" Journal of the Optical Society of America, Feb. 1965.

*Primary Examiner*—Ira S. Lazarus
*Assistant Examiner*—Y. Quach
*Attorney, Agent, or Firm*—Blakely, Sokoloff, Taylor & Zafman

[57] ABSTRACT

An electromagnetic radiation source, such as an arc lamp, is located at a point displaced from the optical axis of a concave toroidal reflecting surface. The concave primary reflector focuses the radiation from the source at an off-axis image point that is displaced from the optical axis. The use of a toroidal reflecting surface enhances the collection efficiency into a small target, such as an optical fiber, relative to a spherical reflecting surface by substantially reducing aberrations caused by the off-axis geometry. A second concave reflector is placed opposite to the first reflector to enhance further the total flux collected by a small target.

43 Claims, 9 Drawing Sheets

CONCENTRATING AND COLLECTING OPTICAL SYSTEM USING CONCAVE TOROIDAL REFLECTORS

FIELD OF THE INVENTION

This invention relates to systems for collecting and condensing electromagnetic radiation, particularly a system for providing a high radiance to a small target such as an optical fiber.

BACKGROUND OF THE INVENTION

Conventional collecting and condensing designs for electromagnetic radiation emphasize collecting and redirecting the maximum amount of light from a source of radiation, approximated by a point source. To produce a small spot size based on these designs results in a decrease in radiation flux because conventional designs (i.e., the collection and redirection of the maximum amount of light) inherently conflict with the goal of concentrating the radiation flux into the smallest possible spot size when the radiation originates from conventional incoherent sources. Thus, images of small spot size may be obtained only by a corresponding decrease in flux density.

There are two basic optical designs in common use for collecting and condensing radiation. The first is a system of condenser lenses such as illustrated in FIG. 1. Condenser lenses have several problems which include creation of chromatic and spherical aberrations, relatively high cost, inherently difficult alignment, and large amount of space. Ellipsoidal reflectors as shown in FIG. 2 are also used in prior art systems. Their problems also include high cost and an unavoidable magnification of the image (i.e. a reduction in the flux density). Both of these systems tend to emphasize redirection of the maximum amount of flux from a point source at the expense of the flux density, as discussed above.

U.S. Pat. No. 4,757,431, the embodiment of which is incorporated herein by reference (FIG. 3), describes an improved condensing and collecting system employing an off-axis spherical concave reflector which enhances the maximum flux illuminating a small target and the amount of collectable flux density by a small target. The off-axis spherical concave reflector described in this patent has certain disadvantages, namely, astigmatism parallel to the direction of the off-axis displacement and the physical limitations inherent in the requirement to minimize this distance. The effect of astigmatism is to decrease the concentrating efficiency of the system and thereby reduce the flux collected at a target. The requirement to minimize the off-axis distance between the source and the target (i.e. minimize astigmatic distortion), imposes limitations on the physical dimensions of a source and target of the described embodiment. The teachings of the use of a deformable spherical concave reflector does not lead to the use of a toroidal reflector having two perpendicular and unequal radii of curvature.

SUMMARY OF THE INVENTION

The present invention represents an improvement over the system disclosed in U.S. Pat. No. 4,757,431 in three ways: (i) it enhances the concentration and collection of radiation emitted by a point-like source of electromagnetic radiation into a small target; (ii) it increases the collectable flux into a small target, and (iii) it improves the collection and coupling efficiency between a source of electromagnetic radiation and a small target for any "off-axis optical system" as described in U.S. Pat. No. 4,757,431, particularly in the reduction of the preferred embodiment into practical systems.

To achieve these and other objectives, the present invention employs as the primary optical element a concave reflecting surface having different radii of curvature along two orthogonal axes (i.e. a toroidal reflector), a source of electromagnetic radiation and a target (i.e. an optical fiber). The source and target are located at similar distances on opposite sides of the optical axis of the system which is defined as the optical axis of the concave toroidal reflector (the "off-axis reflector"). For concentrating maximum flux density at the target, a retro-reflector, preferably of toroidal design or alternatively of spherical design, is located behind the source to reflect and re-focus radiation from and back through the source onto the toroidal reflector. The retro-reflector together with the off-axis toroidal reflector act as a system for maximizing the collectable flux density of radiation concentrated at the target. The system substantially improves the collectable radiance at the target in two ways: (i) the toroidal design of the reflectors substantially corrects for astigmatism caused both by the off-axis geometry and glass-envelope of typical electromagnetic radiation sources such as an arc lamp and (ii) the retro reflector increases the effective brightness of the radiation source. The maximum optical efficiency of the system is obtained by optically matching the reflectors and target, while the maximum flux density at the target and, in particular, collectable by an optical fiber as the target, is obtained both by maximizing the system efficiency and optically matching the source, reflectors, and target. Whereas prior art teaches the use of ellipsoidal reflectors "on-axis" or deformable spherical concave reflectors "off-axis," in practice the use of aspheric mirrors is expensive. A significant advantage of the present system is the use of very inexpensive aspheric mirrors, toroids, to concentrate light at a target in which the collectable flux density at the target is insensitive to the surface quality of the mirror.

DETAILED DESCRIPTION OF THE INVENTION

Figure 1:
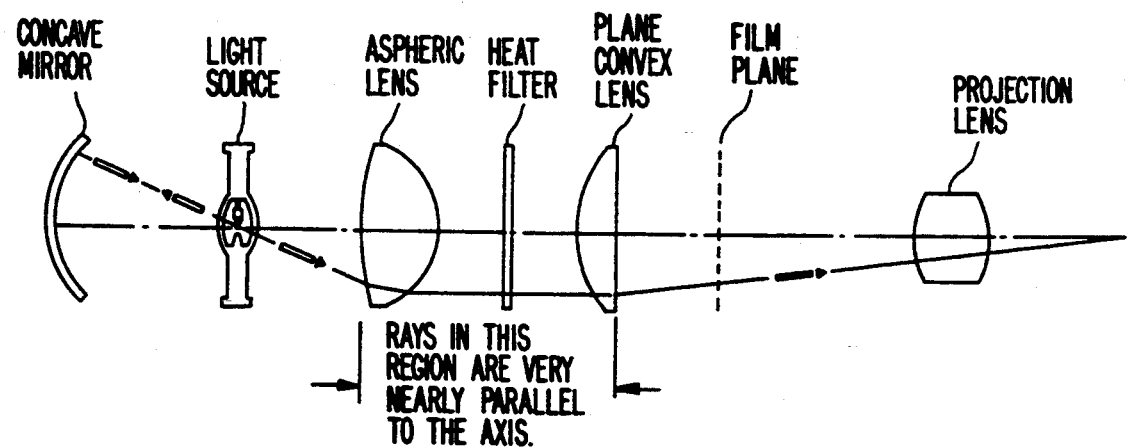
FIG. 1 is a schematic illustration of a prior art condenser lens system.
Figure 2:
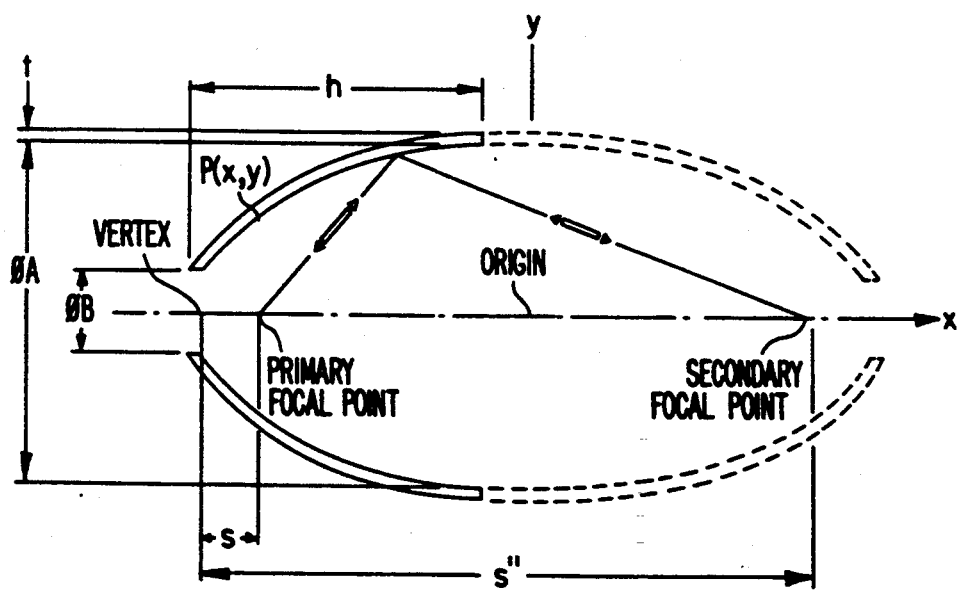
FIG. 2 is a schematic illustration of a prior art ellipsoidal lens system.

In the following description, for purposes of explanation and not limitation, specific details are set forth, such as particular numbers, dimensions, optical components, etc. in order to provide a thorough understanding of the present invention. However, it will be apparent to one skilled in the art that the present invention may be practiced in other embodiments that depart from these specific details. In other instances, detailed descriptions of well known devices and techniques are omitted so as not to obscure the description of the present invention with unnecessary detail.

A condensing, collecting, and concentrating optical system built in accordance with this invention consists of three main components (FIG. 4). The fourth, a retro-reflector, is optional, but improves performance.

(1) Source. An optical point source of electromagnetic radiation. In the context of this invention, a point source is any compact source of electromagnetic radiation whose angular extent is small and emits flux into $4\pi$ stearadians. Typically, the linear angular size of such a source is no more than 0.1 radian. For example, a typical source may be an electric arc lamp with an arc gap of approximately 1 mm placed in front of a concave reflector at a distance of approximately 50 min. In practice, such a source is an extended source. In the preferred embodiment, this is a compact xenon arc lamp with an arc gap $\leq 1$ mm and a quartz lamp envelope or ceramic enclosure with a quartz window. However, any source of electromagnetic radiation which is of similar size to or smaller than the target may be used (e.g. fiber, filament lamp, gas discharge lamp, laser, LED, semiconductor, etc.). The size of the electromagnetic source here is better defined by the 1/e intensity of the intensity contour map which characterizes the brightness (flux density over angular extent) of the source. Brightness is related to the size of the arc gap and determines the theoretical limit of coupling efficiency. For the specific case of an arc lamp, the contour approximates axial symmetry and is a complex function of electrical rating, electrode design and composition, gas pressure, arc gap size, and gas composition. For the specific case of an arc lamp having an aspherical curved envelope, the effective relative position and intensity distribution of the source imaged by the reflector undergoes aberration. This is caused by the shape of the envelope which essentially functions as a lens and requires a compensating optical element. Optical compensation can be achieved either by modifying the design of the reflector to compensate for the astigmatism caused by the envelope or by inserting a correcting optic between the off-axis reflector (see below) and the target. Additionally, optical coatings can be applied to the envelope to minimize Fresnel reflections and thereby maximize collectable radiation at the target or to control and/or filter the radiation flux.

(2) Reflector. The reflector (off-axis) reflects and focuses electromagnetic radiation from the source onto the target. Its optical axis defines the Z axis of the system, relative to which both the source and target are off-axis. In the context of this invention, the reflector is a portion of a toroidal reflector concave relative to the source, the exact design and placement for which depends on the characteristics of the source and the target. In the preferred embodiment of this invention, its exact design depends on the characteristics of the source and the target. These characteristics are as follows: for the target (i) size, (ii) shape, (iii) off-axis displacement (see below), and (iv) for a fiber optic target, the numerical aperture, diameter, and angle of the proximal end relative to the off axis reflector, defined as the angle between the transverse and longitudinal axes of the fiber; for the source, (i) size and brightness, (ii) effective numerical aperture, and (iii) astigmatism caused by the source envelope or enclosure if present. Optical coatings can be applied to the surface of the reflector to enhance reflection or to control and/or filter, the radiation flux. Additional astigmatic correction can be accomplished with a lens or tilt plate inserted between the reflector and target, with or without optical or dielectric coatings.

(3) Target. The target is a small object which needs to be irradiated or illuminated with the highest flux density electromagnetic radiation possible. In the preferred embodiment, it is a single optical fiber with a diameter near 1 mm or smaller. The properties of the optical fiber, diameter and numerical aperture, must be matched to the optical characteristics of the system consisting of source and reflector. The efficiency of collection and transmission can be enhanced or controlled by adding optical preparations to the input end of the fiber. Alternatively, the target can be a single optical fiber or a grouping of optical fibers having similar or dissimilar shapes, sizes, materials, and numerical apertures and arranged either symmetrically or asymmetrically. The end(s) of the fiber(s) is (are) typically flat-polished, perpendicular to the longitudinal axis (axes) of the fiber(s); however, the end proximal to the reflector can be polished at an angle (i) to compensate both for the asymmetric image of the electromagnetic radiation source, such as an arc lamp and for astigmatism introduced by the off-axis geometry and lamp envelope, (ii) to modify the relative numerical aperture of the fiber to the optical collection system, and (iii) to adjust for the relative angle of the longitudinal axis of the proximal end of a fiber optic target relative to the optical axis of the system.

(4) Retro-reflector. A retro-reflector reflects and re-focuses radiation from and back through a source, effectively increasing the brightness of the source by overlaying an inverted intensity distribution of radiation onto the original source. In the preferred embodiment of this invention, the retro-reflector is a portion of a toroidal reflector concave relative to the source. In an alternative embodiment, the retro-reflector is a portion of a spherical reflector. Its exact designs depend on the shape and size of the source relative to the size of the target (and the numerical aperture in the case of a fiber optic target) and the aspheric correction necessitated by the source envelope, if any. Additionally, optical coatings can be applied to the surface of the retro-reflector to enhance reflectivity, or to control, filter, and/or attenuate radiation flux.

Figure 4A:
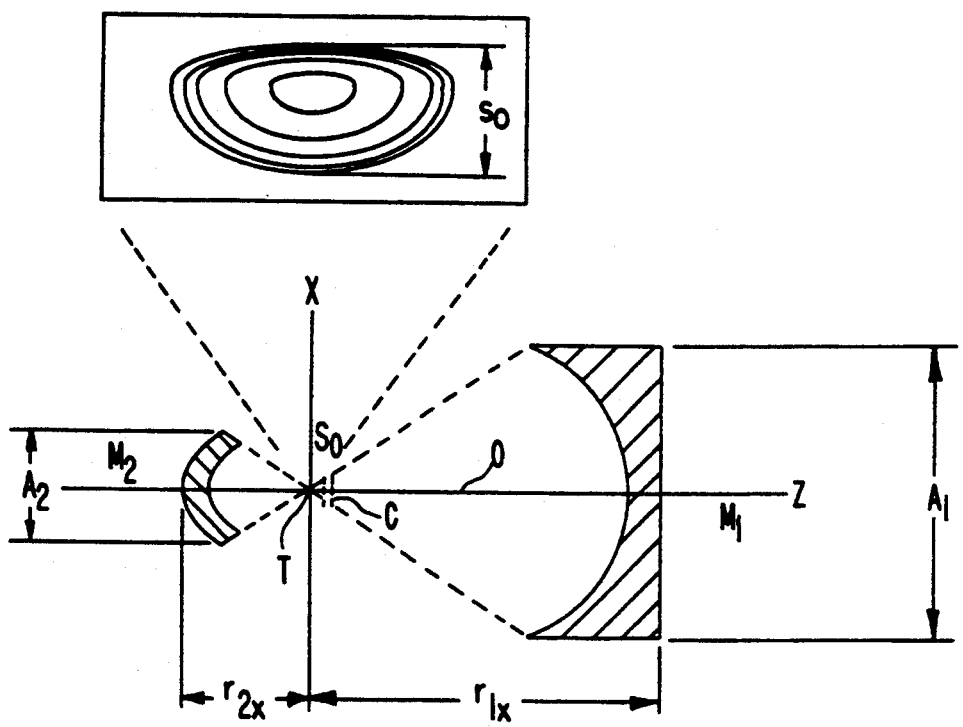
FIG. 4a is a schematic illustration in the x-z plane of the present invention.
Figure 4B:
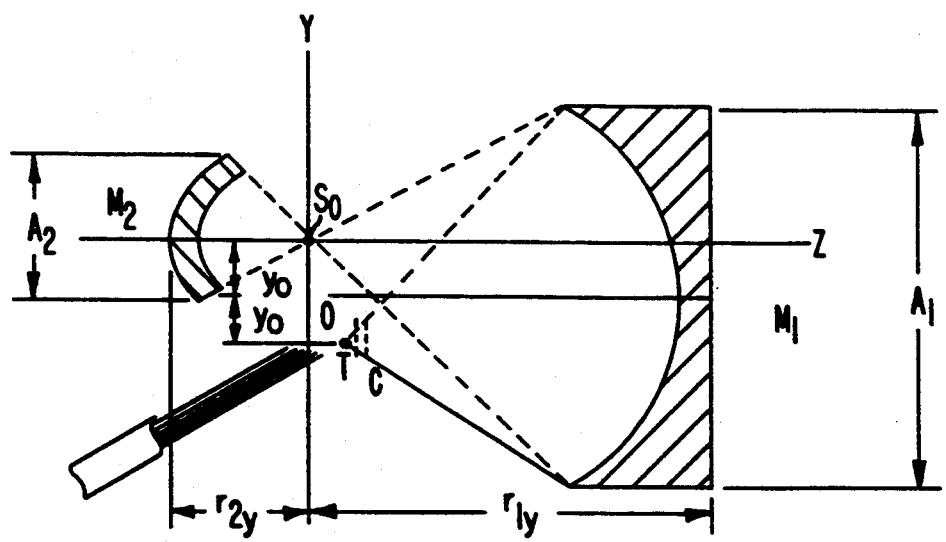
FIG. 4b is a schematic illustration in the y-z plane of the present invention.

FIGS. 4a & 4b illustrate an idealized concentrating and collecting system according to the present invention. On opposite sides of the optical axis O of the system are a source $S_O$ and target T each displaced a distance $y_o$ from the optical axis, defined by the center of curvature and optical axis of toroidal reflector $M_1$ (off-axis reflector). (The optical axis of a toroidal reflector is defined as the normal to the perpendicular intersection of the radii of curvature.) Also, a retro-reflector $M_2$ is located behind the source $S_o$ with the source at a distance approximately equal to its radius of curvature. Although the preferred embodiment includes this retro-reflector for maximal concentration of radiant flux density, it is not essential for condensing, concentrating, and collecting radiation at the target.

As shown in FIG. 4, the off-axis displacement, $Y_o$, is equal for a source $S_o$ and target T. In the reduction to practice of the present invention, the off-axis displacement of the source may be different from that of the target. For the latter, the effective optical axis of the system will lie between the target and the source and may be different from the optical axis of the reflector. The exact location of effective system optical axis in this case will depend on the numerical aperture of the target and the effective numerical aperture of the reflector. When the optical axis of the off-axis reflector is not an exact description of the sytem optical axis, the effective optical axis of the system is determined from a proper matching of the numerical aperture of the source to the effective numerical aperture of the reflector and the numerical aperture of the target. The effective numerical aperture of the reflector will differ from the theoretical numerical aperture if that portion of the reflector actually used to condense and concentrate light within the acceptance angle of the target is smaller than the full aperture, $A_1$, in FIG. 4. For systems in which the numerical aperture of the target is less than that of the off-axis reflector, the effective numerical aperture of the reflector will be less than its theoretical numerical aperture.

Figure 3A:
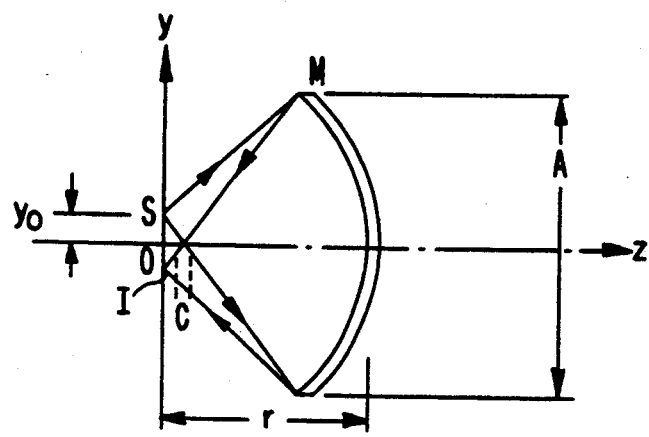
FIG. 3a is a schematic illustration in the y-z plane of a prior art system employing a spherical reflector.
Figure 3B:
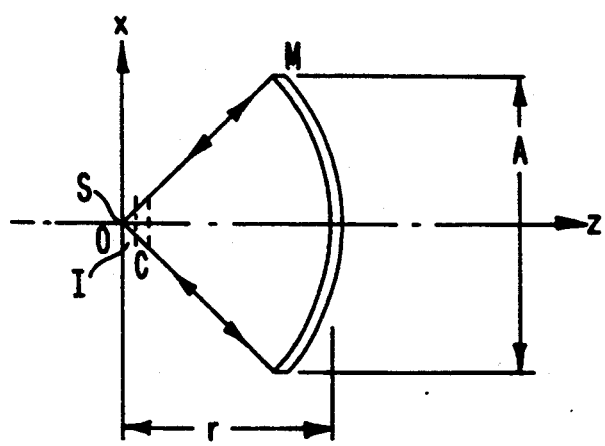
FIG. 3b is a schematic illustration in the x-z plane of a prior art system employing a spherical reflector.

It will be observed that the geometry of the system illustrated in FIGS. 4a & 4b is quite similar to that which is disclosed in U.S. Pat. No. 4,757,431, FIGS. 3a & 3b, shown here for comparison. As explained in that patent, the use of a spherical reflector imposes the restrictions that the square of the off-axis distance ($y_o^2$) divided by the radius of curvature of the off-axis reflector (r) be less than the extent of the source ($S_o$). As discussed below, this restriction is eased by the enhancements of the present invention.

Figure 5:
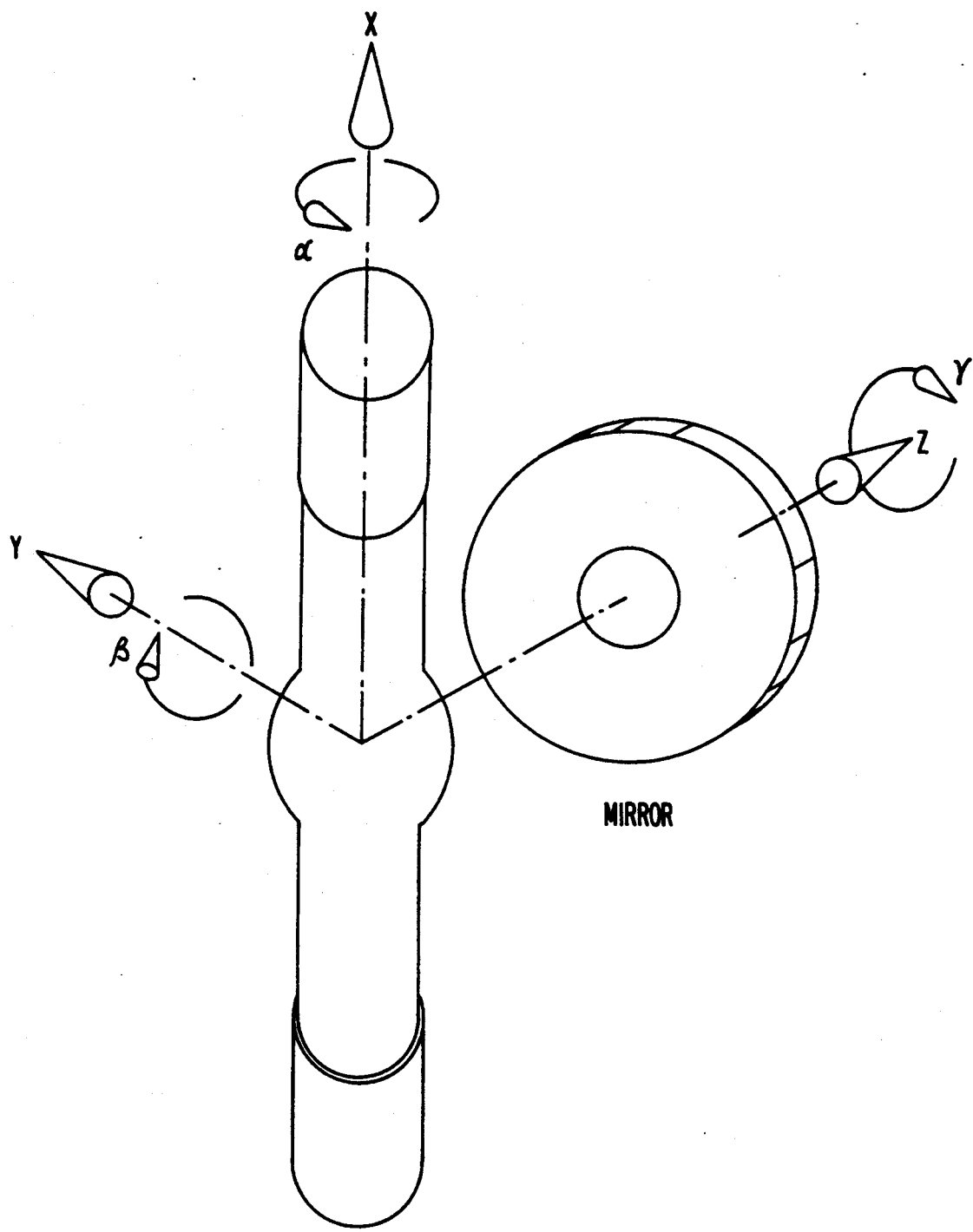
FIG. 5 is a coordinate system of the embodiment of the present invention.
Figure 6A:
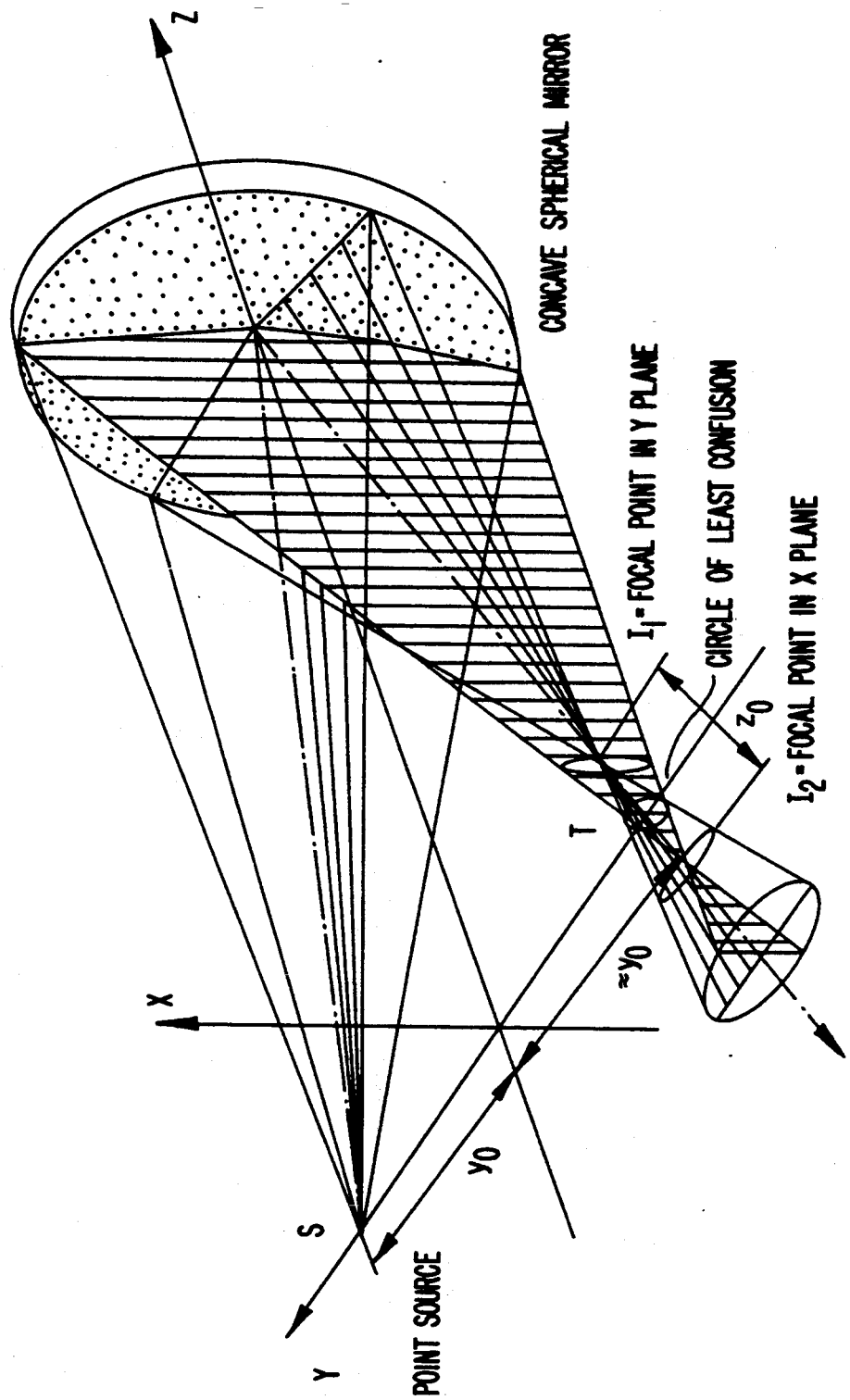
FIG. 6a is a ray diagram illustrating the optimum image locations for a concave spherical reflector to maximize the concentration and collection of radiation at a target.
Figure 6B:
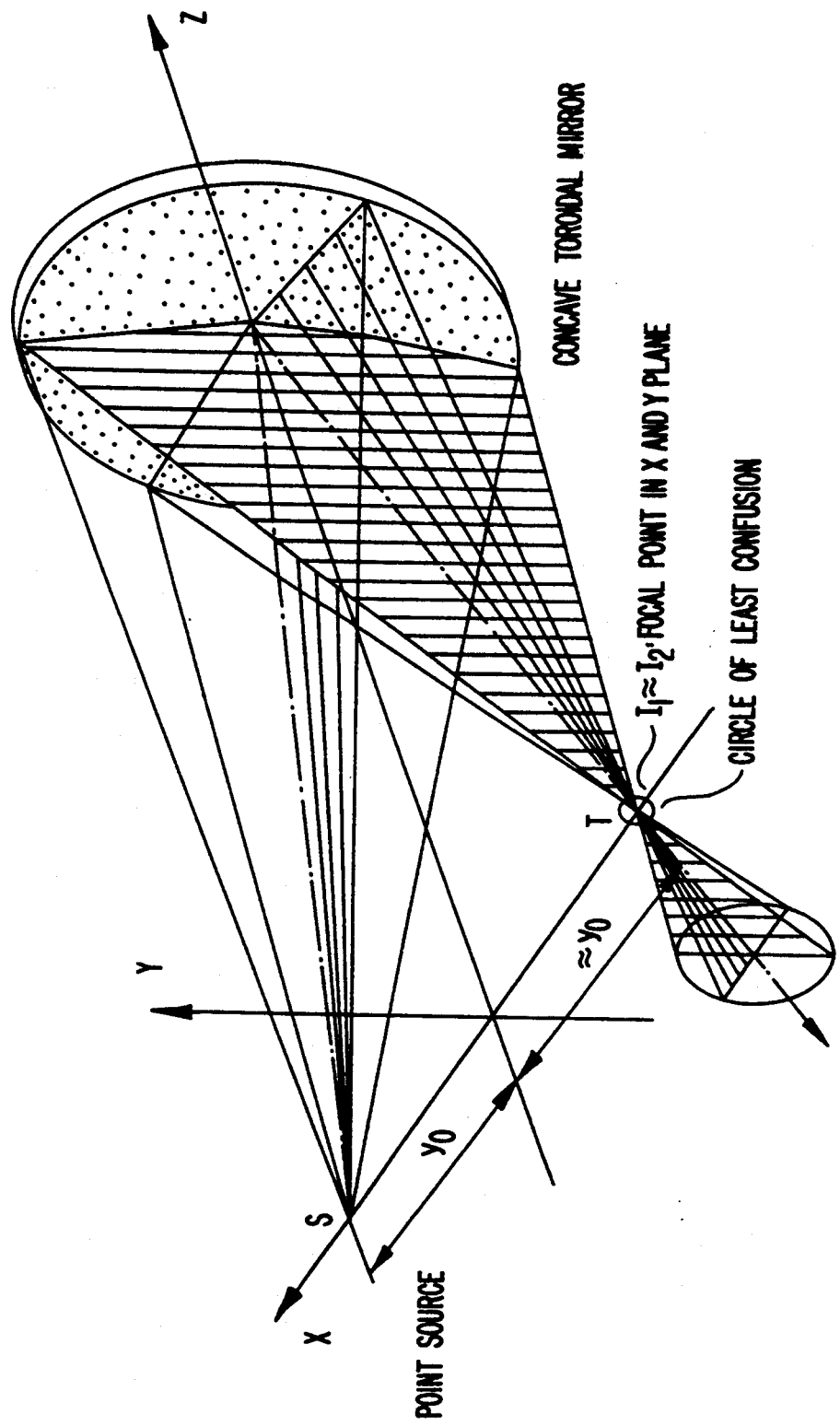
FIG. 6b is a ray diagram illustrating the optimum image locations for a concave toroidal reflector to maximize the concentration and collection of radiation at a target. Note that the result of having two radii of curvature to compensate for optical aberrations nearly collapses $l_1$ and $l_2$ in a theoretical sense into the circle of least confusion. In a practical sense, $l_1$ and $l_2$ are at the circle of least confusion (see FIG. 6a) and the size of the image at the circle of least confusion is larger than that of the source depending on the extent to which the toroidal design is optimized.

Whereas the above-cited patent teaches (i) that the source relative to the spherical concave mirror should be placed at a distance along the z axis equal to the radius of curvature of the mirror and a distance, $y_o$, off-axis, such that $(y_o^2)/r < S_O$ and (ii) that the optimum location for a target is then the image point defined as the circle of least confusion, further analysis reveals that positioning the target at this location is not necessarily optimum as defined in U.S. Pat. No. 4,757,431. Its exact location depends on the characteristics of the source, of the reflectors, and/or of the transmissive optic(s) placed between the target and the source. It also depends on the target and, in particular, for an optical fiber, on its shape, size, numerical aperture (NA), and cross sectional angle relative to the optical axis at the proximal end relvative to the off-axis reflector. The present invention, therefore, is an optical system that increases and enhances the concentration and collection of radiant flux at a target. It also increases and enhances the degree of illumination of the target. In the case of a multimode optical fiber as the target, the fiber may act as an active element that randomizes and scrambles transmitted radiant flux thereby eliminating optical aberrations and optical memory. FIG. 5 further illustrates the coordinate system of one embodiment of the present invention. Because the optical system of the present invention can be constructed with many variations in sources, targets, and optical components, the location of maximum collectable flux for a given target is defined as the location of maximum flux density for the specific set of components of the system and may or may not coincide with the location of maximum total flux density, total flux, or image point (circle of least confusion). For targets placed at the image point, the present invention provides an optical imaging system of increased radiant flux density compared to what is achievable with prior art. Nevertheless, this system may not be optimized to provide the maximum theoretical collection efficiency. The optimum location for the placement of a target in the present invention will depend on the characteristics of the target and can be classified as follows.

Case 1: For targets placed at the image point (circle of least confusion) which are of similar size to or larger than that of the source, the system has approximately unit magnification. In this case the system is typically optimized if a fiber optic target has a numerical aperture equal to or larger than that of the off-axis mirror.

Case 2: For targets smaller than the source or for fiber optic targets having a smaller numerical aperture than that of the off-axis mirror of case 1, there exist toroids specific for a given source and a target that optimize the collectable flux density at the target which may be different than case 1. Hence, for a target described by case 2, there is a corresponding optimized toroid for a given source. These systems of sources and targets of unmatched size, having specifically optimized off-axis toroidal reflectors, image at a magnification approximately equal to unity as in case 1 and the target is placed at the image point.

Case 3: For practical systems involving a given source and a toroidal reflector optimized for a target of specified characteristics (e.g., diameter, shape, numerical aperture for a fiber optic target as discussed in cases 1 and 2), use of such an optimized system with targets having sizes or numerical apertures other than those of the optimized target may require different positioning of the target and the reflector relative to the source, In case 3, the system deviates from unit magnification in that the toroidal reflector typically must be translated along the z-axis and positioned relative to the source at a distance so as to optimize the positioning of that portion of the reflector-surface which concentrates the maximum flux density within the angle of acceptance of the target. Relative to cases 1 and 2, the location of the target may differ substantially and the effective numerical aperture of the reflector is matched to the numerical aperture of the target. The effective optical axis of the system may also differ from the idealized geometry of FIG. 4.

In systems characterized by case 3, there may exist a locus of points having similar collectable flux densities for a given target depending on the characteristics of the source. For arc sources and other similar extended sources, that portion of the intensity contour collectable by a fiber optic target will vary with target size and with numerical aperture of both target and off-axis mirror. Hence, that portion of the source actually imaged or collected at the target varies. For small targets there may exist more than one part of the intensity contour that produces the same collectable flux density at the target, enabling the target to be placed at a locus of points to achieve similar collectable flux densities. Thus for case 3, the system is said to concentrate rather than image flux density from the source at the target. In this case for which a locus of points of similar flux densities exist for a given target, the size of the target will always be smaller than that of the source and the source will have an intensity contour that will vary over its nominal size.

In the present invention and in U.S. Pat. No. 4,757,431, the degradation of the radiant flux of the source at the focal point, image point, or location of the target is primarily caused by astigmatism produced in the y-direction by the off-axis geometry. Secondarily, for a source containing a glass envelope, such as an arc lamp, astigmatism is caused by the aspherical shape of the glass envelope itself. In U.S. Pat. No. 4,757,431 the deficiency of the spherical reflector is that the projection of the rays onto the y-z plane converge closer to the reflector than do the projection of the rays onto the x-z plane. The current invention improves on the teachings of this patent in the substitution of a toroidal surface having its longer radius of curvature along the y-axis and shorter radius of curvature along the x-axis. The difference in radii causes the convergence of rays in the y-z plane to be repositioned to coincide with that in the x-z plane. This substitution reduces the size of the focal point by reducing the total system astigmatism, thereby both increasing the concentrating power of the optical system and enhancing the collectable radiant flux at the target. In the specific case of a target being placed at the circle of least confusion, a toroidal reflector substantially reduces the size of the image. For example, comparison of the maximum attainable flux, collected by a 1 mm diameter optical fiber from a xenon arc lamp having a nominal 1 mm arc gap, from a spherical reflector and a toroidal reflector, each having the same NA and effective radius, has shown that a toroidal reflector can increase the maximum collectable flux by greater than 40%.

Another advantage of a toroidal over a spherical reflector is its adaptability in reducing and compensating for aberrations in off-axis geometries when non-ideal point sources (e.g., extended sources with aspherical glass envelopes) are used. By rotating the toroidal reflector around the z-axis it is possible to compensate for any of these aberrations and thereby adjust for the practical variations in manufacturing tolerances of components in the optical system. This rotation adjusts the effective focal lengths defined by the radii of curvature along the x-z and y-z planes and thereby concentrates the radiation flux density to a maximum extent. Thus rotation of the toroidal reflector optimizes the flux density at the target by adjusting the radii of curvature to compensate for the particular aberrations in the system.

A practical improvement of the current invention over the previously cited patent is the capability to optimize the flux density at the target for targets of varying size. Whereas larger targets of similar dimensions to the source are positioned for maximum flux at or near the circle of least confusion, as defined in U.S. Pat. No. 4,757,431, smaller targets may not be. For example, in a specific case of a toroidal reflector ($r_{1x}$=50 mm, $r_{1y}$=51.9 mm) used to concentrate maximum energy at a fiber optic target, substantial differences in the location of the fiber occur depending on fiber diameter and NA. When the fiber-diameter (1-mm) is similar in size to the size of source and its NA matches that of the reflector, the fiber is located near the circle of least confusion as defined by the teachings of U.S. Pat. No. 4,757,431, whereas when the NA is substantially smaller, its location for maximum collectable flux density can vary by 0.5 mm. For two fibers each having a diameter similar to the size of the source but differing in numerical aperture by approximately a factor of 2, the locations of each for which flux density is maximized differ by 1.5 mm, because the image points of maximum brightness depend on the angular distribution of flux density which must be optimized for numerical aperture at the target relative to both the NA of the reflector and the brightness of the source. Although small differences of <50 μ in location relative to the size of the fiber or the size of the source make no measurable difference in the collectable flux transmitted through the target, larger dislocations clearly have a measurable impact. To find the location of maximum collectable flux density for a given target requires adjustment of the off-axis toroidal mirror. Hence for unmatched optical systems, target and reflector, the positioning of the target may be different from that of matched optical systems for a given source.

U.S. Pat. No. 4,757,431 teaches that the collecting and condensing system is NA independent. The present off-axis collection system requires that the NA's of the fiber optic target(s) and off-axis reflector(s) be matched or optimized to achieve maximum collectable flux density. For unmatched systems, the reflector must have a NA that is greater than that of the target to achieve maximum collectable flux by a fiber target. For radiation emitting sources, high NA targets and reflectors provide for maximum optical and collection efficiency resulting in maximum concentration of flux density at the target. An optimized system involves matching the characteristics of the source to those of both the off-axis reflector and the target. This involves, for an arc lamp or gas discharge lamp as source, matching the brightness; i.e., intensity contour over the angular extent of the source, to the optical characteristics of the system. For any given set of characteristics describing the off-axis reflector and the target, there is an optimum arc size and effective NA that will produce the highest brightness source able to be coupled maximally to the target.

In the idealized embodiment of the present invention shown in FIG. 4, the source ($S_O$) and target (T) are located at focal points equi-distant and on opposite sides of the optical axis of toroidal reflector, $M_1$, also defined as the system optical axis. The y-z plane is said to contain the source, target and optical axis. In the specific case of an arc lamp as a source (FIG. 5), an x-axis is said to be parallel to the longitudinal axis of the source, defined by the electrodes of the arc gap. The y-z plane containing the optical axis may or may not coincide with the plane containing the arc and fiber optic target. At times it may be desirable to have either $\beta \neq 0$ or $\gamma \neq 0$ both, the exact values depending on the characteristics of the arc, the reflector, optional transmissive optic(s), and the optical fiber. In practice, the collectable flux and system efficiency may be increased by 5-10% by tilting the plane of the optical axis $\beta \approx 5°$ and/or $\gamma \approx 5°$ to achieve optical matching of an arc lamp source and fiber characteristics or to locate the target above or below the y-z plane.

A more nearly ideal reduction of the present invention to practice requires construction of a source, such as an electric arc lamp, that houses both the off-axis mirror and retro-reflector in the same enclosure as that containing the source. The fiber optic target may be placed either internal or external to the enclosure. When it is internal, the fiber is mounted permanently as a part of the fully enclosed assembly of source, off-axis mirror, and retro-reflector. When it is external, either a window placed near the optimal location of a fiber optic target (FIG. 8) or a fiber optic coupling mechanism is used to couple the focused image of the source to the fiber optic target. The performance of such a device will depend on whether the off-axis mirrors are toroidal or spherical and the extent to which the configuration is displaced off-axis. For the case in which the off-axis displacement is minimized, the performance of spherical and toroidal reflectors will be similar. This construction eliminates aberrations that are inherent in aspheric glass envelopes associated with short arc gap lamps, and, therefore, spherical, on-axis retro-reflectors will perform as well as toroidal designs. Arc lamps constructed without aspheric glass envelopes, such as those constructed with ceramic enclosures and a window(s), are able to avoid envelope-induced aberrations and to simulate near ideal conditions without enclosing the source and optics in a single enclosure.

U.S. Pat. No. 4,757,431 teaches that the use of a spherical reflector imposes the restriction that $y_o^2/r < s_o$. This restriction limits the physical design of the system by requiring that the target be placed, in practice, at the minimum off-axis distance which is adjacent to the envelope. By contrast, the radii ($r_{1x}$ & $r_{1y}$) of the toroidal reflector can be chosen such that this restriction on the value of $y_o^2/r$ is considerably relaxed. This allows for additional space between the source/source envelope and the target. The additional space eliminates potential obstruction of the focal point by the envelope and permits the placement of optical elements (e.g., filter, correcting tilt plate, lens, etc.) or mechanical elements (e.g., shutter, iris, etc.) to attenuate, control, and/or filter the radiant flux density incident on the target. In the preferred embodiment of the previously cited patent, to obtain the maximum collectable flux with a spherical reflector with $r=50$ mm and $s_o \approx 1$ mm, $y_o$ is restricted to be no greater than $\approx 7$ mm. Since the maximum envelope diameter is $4y_o$ consistent with both of the constraints that $y_o^2/r < s_o$ and that the off-axis distance be a minimum, the maximum diameter of the lamp envelope required by U.S. Pat. No. 4,757,431 is $\approx 28$ min. In practice this places the optical fiber adjacent to the envelope. Substituting a toroidal reflector with $r_{1x}=50$ mm and $r_{1y}=51.9$ mm, the optimized position for a 1 mm optical fiber is $y_o=10$ mm and the total collected energy at the fiber optic target is 40% greater than that achievable from the comparable 50 mm diameter spherical reflector taught by U.S. Pat. No. 4,757,431. Thus $y_o^2/r > s_o$ for the invention described here and this feature enables an optical fiber target to be placed away from the envelope. This improvement also facilitates the use of lamps with a larger diameter. Since the diameter of an arc lamp is proportional to its operating wattage, a larger lamp envelope allows the arc lamp to be operated at a higher wattage, thereby increasing the collectable flux. For the example cited here, a higher wattage lamp with a $\approx 40$ mm diameter envelope could be used.

Since most arcs are not symmetrical and differ in their x and y dimensions, an improvement on the order of 10% in collected radiation can be realized by polishing a cylindrical optical fiber at an angle such that the cross sectional area resembles an ellipse. By changing the angle of the proximal end of the fiber from normal to the optical axis, the longitudinal axis of the fiber optic target can be pivoted or swiveled to maximize the collectable flux density and the irradiation or illumination of the target.

The basic optical configuration described herein can be expanded to include a second concave reflector $M_2$ (i.e. retro-reflector). This retro-reflector is located behind the source to reflect and re-focus flux from and back through the source onto the toroidal reflector. The concave reflector can be either spherical or toroidal. The improvement in the collectable flux in using such a concave retro-reflector depends on the characteristics of the source, source envelope, off-axis toroid reflector, and target and varies from 10% to 75%. The retro-reflector should be optically matched to the source and its glass envelope (if present) as well as to the toroidal reflector and target to produce a system that maximizes both collectable radiation flux and system efficiency. Toroidal designs are superior for sources having glass envelopes (enclosures) because they facilitate the reduction of astigmatism caused by the aspheric envelope. Correction of this astigmatism can produce improvements in total collected radiation flux by 20% over a spherical retro-reflector. A self-contained system as shown schematically in FIG. 8 could be optimized with either a spherical or toroidal retro-reflector depending on the target.

Figure 7A:
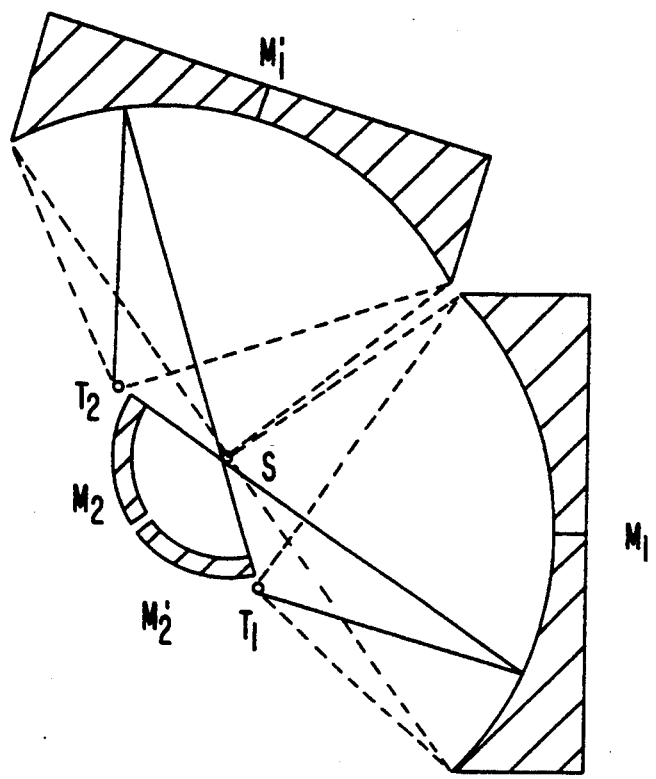
FIG. 7a is a schematic illustration of the optical configuration of FIG. 3a expanded to include two off-axis and two secondary retro-reflectors.
Figure 7B:
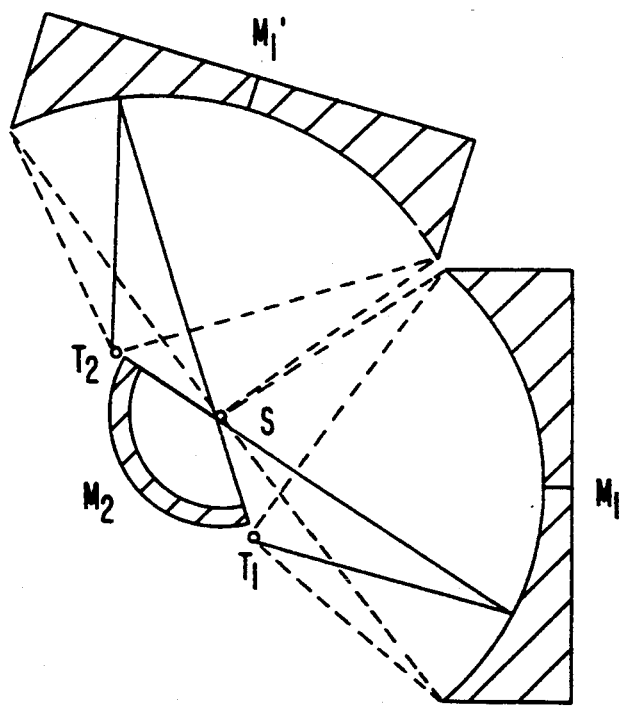
FIG. 7b reduces the two secondary retro-reflectors of FIG. 5 to a single nearly hemispherical reflector having two radii of curavture in orthogonal planes unequal (toroidal) or equal (spherical) depending on the source.
Figure 8:
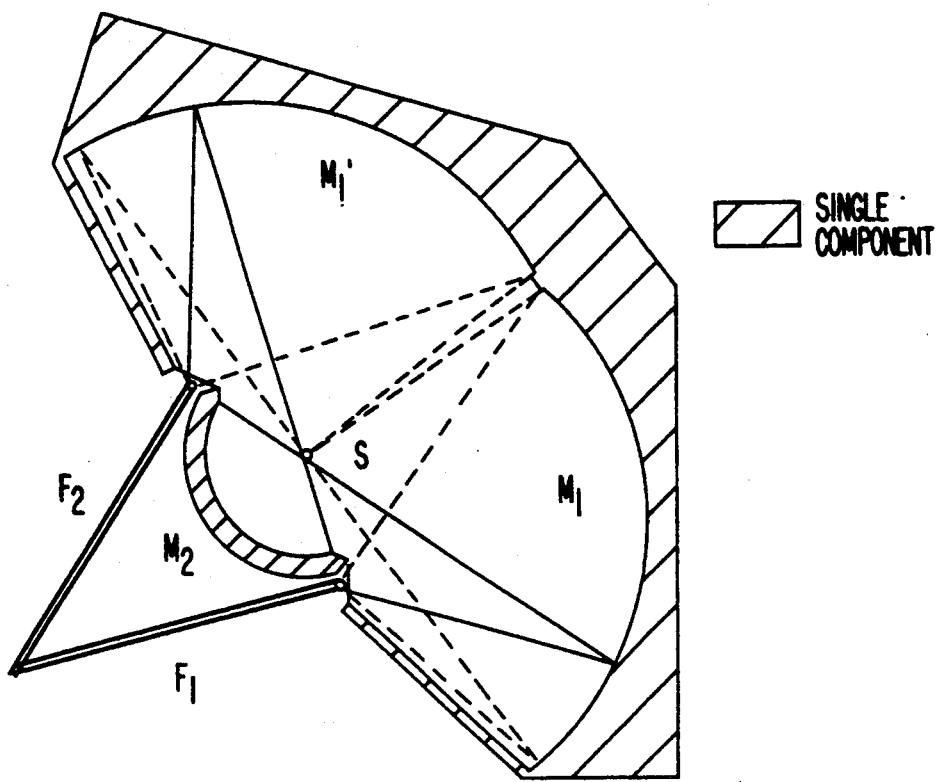
FIG. 8 is a schematic illustration of the optical configuration in which the reflectors and source are assembled and substantially fabricated as one self contained unit.
Figure 8A:
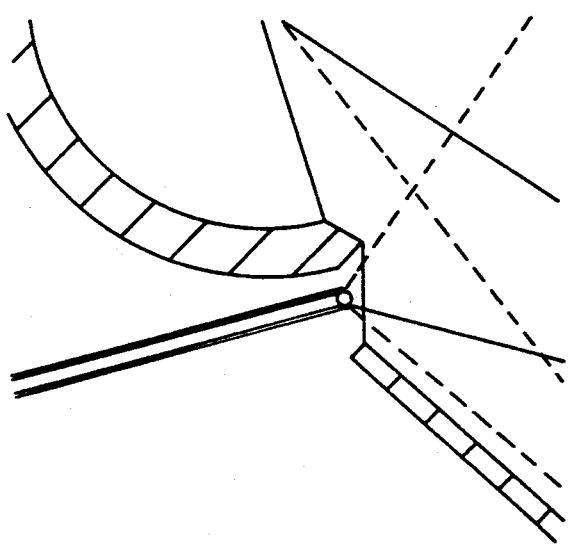
Figure 9:
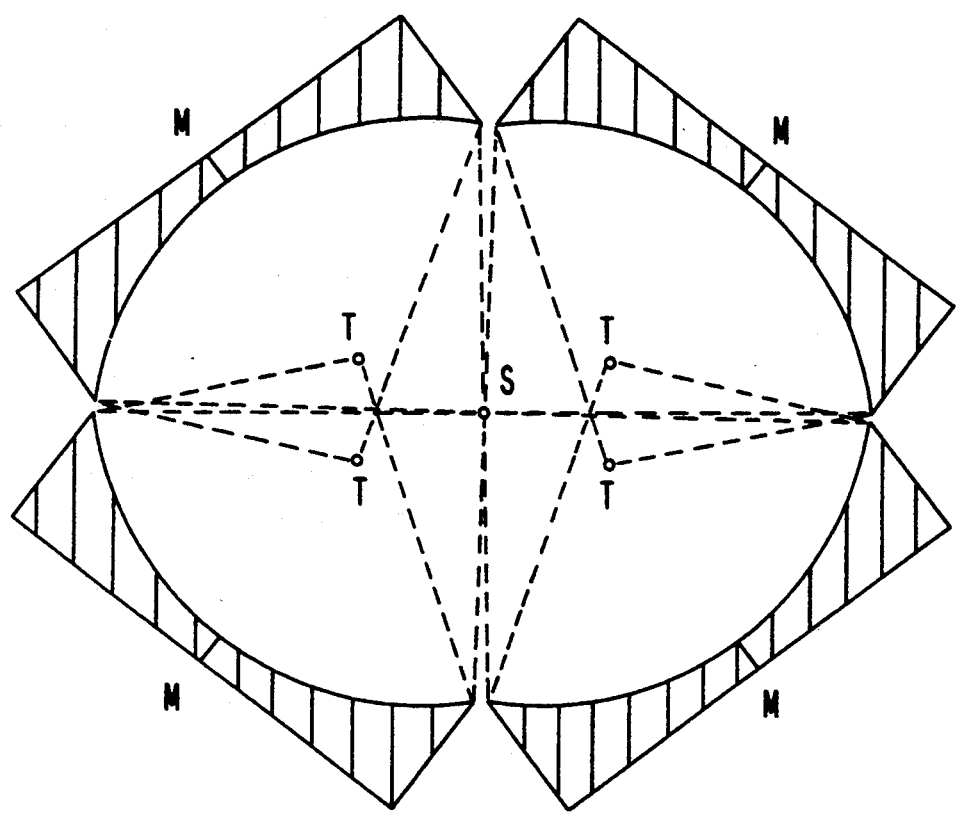
FIG. 9 is an extension of the invention to include four targets coupled to the electromagnetic radiation source by four off-axis toroidal reflectors.

The optical configuration described herein can be expanded to include multiple off-axis reflectors (as are discussed in the previously cited U.S. Pat. No. 4,757,431) multiple retro-reflectors and multiple targets. The optical system of FIG. 4, without retro-reflector $M_2$, could accommodate a total of four off-axis reflectors and four targets as shown in FIG. 9. Inclusion of the second reflector $M_2$ reduces the system to two off-axis reflectors and two targets as shown in FIG. 7. FIG. 8 shows the reduction of reflectors $M_2$ in FIG. 7 to a single nearly hemispherical retro-reflector. In the case of four off-axis reflectors, each reflector would collect electromagnetic radiation from the source over $\approx 90°$ solid angle. In the case of two off-axis reflectors, each reflector would collect over $\approx 90°$ solid angle from the source, and a pair of reflectors $M_2$ or the single retro-reflector of FIG. 4 would focus light back through the source over $\approx 90°$ or $\approx 180°$ solid angle respectively. FIG. 8 shows the reduction of the optical configuration in FIG. 4 in which the two reflectors and sources are assembled and substantially fabricated as one self-contained unit. In practice any combination of off-axis mirrors and retro-reflectors with a means to couple a target to the concentrated flux density either through a window or fiber optic fitting could be fabricated as one self-contained unit. Although the number of off-axis mirrors could be increased beyond 4 for applications requiring more than 4 targets, in practice such an optical system would not maximize the collectable flux density at the target.

We claim:

1. A system for condensing, concentrating and collecting electromagnetic radiation to provide a high intensity illumination source having as much radiation flux as possible in a small area, said system comprising:
   a primary electromagnetic radiation reflector having an optical axis and a substantially toroidal reflecting surface concave to a source of highly divergent broadband, incoherent radiation;
   said source located near a center of curvature of said reflector, but laterally offset a first distance from the optical axis of said reflector so as to produce a substantially focused image of said source upon reflection from said reflector, at a point laterally offset from said optical axis by a second distance, wherein radii of curvature of said toroidal reflecting surface differ in length by about 4%; and
   a target located near a point of maximized collectable flux density to collect said electromagnetic radiation.

2. The system of claim 1 wherein said toroidal reflecting surface has a radius of curvature in a first plane containing said optical axis, said source, and said target that is greater than a radius of curvature in a second plane containing said optical axis and which is orthogonal to said first plane.

3. The system of claim 1 wherein said target is located at a point of maximized concentrated flux density which is substantially coincident with the substantially focused image point.

4. The system of claim 1 further comprising a correcting optic placed between said reflector and said target for improving the focus of said focused image on said target.

5. The system of claim 4 wherein the correcting optic is treated with an optical preparation for controlling the spectral intensity distribution of the source.

6. The system of claim 1 wherein said second distance is substantially equal to said first distance.

7. The system of claim 1 wherein said second distance differs from said first distance.

8. The system of claim 1, wherein said radii of curvature of said toroidal reflecting surface comprise lengths of 50.0 mm and 51.9 mm.

9. The system of claim 1 wherein the target is an optical fiber target having a collection end positioned near the point of maximum collectable flux density.

10. The system of claim 9 wherein the collection end of the optical fiber target is polished at an angle selected to compensate for astigmatism introduced by the envelope of the light source and by the toroidal reflecting surface.

11. The system of claim 9 wherein the collection end of the optical fiber target is polished at an angle selected to adjust the relative numerical aperture of the fiber to match the relative numerical aperture of the source and reflecting surface.

12. The system of claim 9 wherein the collection end of the optical fiber target is polished at an angle selected to maximize the amount of light coupled into the optical fiber.

13. The system of claim 1 wherein a numerical aperture of the optical fiber target is less than a numerical aperture of the source and reflector and wherein the target is offset from the image point of the reflector.

14. The system of claim 1 wherein the toroidal reflecting surface is tilted at an angle relative to a plane containing the source, the target and the optical axis of the reflector to increase the flux density at a target location.

15. The system of claim 1 wherein the envelope of the source is substantially cylindrical and has a longitudinal axis and wherein the longitudinal axis of the envelope is tilted from a perpendicular to a plane containing the target and the optical axis of the reflector to increase the flux density at the target.

16. A system for condensing, concentrating and collecting light to provide a high intensity light source for illumination having as much radiation flux as possible in a small area, said system comprising:
   a primary electromagnetic radiation reflector having an optical axis and a substantially toroidal reflecting surface with radii of curvature varying in length with respect to each other to obtain an image point of high flux density;
   a light source providing highly diverging, broadband, incoherent light, said source surrounded by an envelope, said source further located near the optical axis of said reflector but offset a first distance from the optical axis of said reflector so that the light of said source is focused and concentrated at an image point offset from the optical axis of said reflector by a second distance, said image point being opposite said source with respect to the optical axis of said reflector, said radii of curvature of said reflecting surface being selected to position said image point just outside of said envelope from said source, wherein said radii of curvature of said toroidal reflecting surface differ in length by about 4%; and
   an optical fiber target having a collection end thereof located near a point of maximum collectable flux density.

17. The system of claim 16 wherein said second distance is substantially equal to said first distance.

18. The system of claim 16 wherein said second distance differs from said first distance.

19. The system of claim 16 wherein said toroidal reflecting surface has a radius of curvature in a first plane containing the optical axis of said reflector, said source, and said image point that is greater than a radius of curvature in a second plane containing the optical axis of said reflector and which is orthogonal to said first plane.

20. The system of claim 16 in which said target is located at a point of maximized concentrated flux density which is substantially coincident with the image point.

21. The system of claim 16 further comprising a correcting optic placed between said reflector and said target for improving the focus of said image on said target.

22. The system of claim 21 wherein the correcting optic is treated with an optical preparation for controlling the spectral intensity distribution of said source.

23. The system of claim 11 wherein said optical fiber target is comprised of a plurality of optical fibers, in which said plurality of optical fibers are bundled together.

24. The system of claim 23 wherein said plurality of optical fibers have substantially identical optical properties.

25. The system of claim 23 wherein at least some of said plurality of optical fibers have a substantially different diameter from that of others of said plurality of optical fibers.

26. The system of claim 23 wherein at least some of said plurality of optical fibers have a substantially different numerical aperture from that of others of said plurality of optical fibers.

27. The system of claim 23 wherein at least some of said plurality of optical fibers have a substantially different shape from that of others of said plurality of optical fibers.

28. The system of claim 23 wherein at least some of said plurality of optical fibers have a substantially different material composition from that of others of said plurality of optical fibers.

29. The system of claim 16 wherein the collection end of said optical fiber target is polished at an angle substantially perpendicular to a longitudinal axis of said optical fiber target.

30. The system of claim 16 wherein the collection end of said optical fiber target is polished at an angle substantially inclined with respect to a plane perpendicular to a longitudinal axis of said optical fiber target.

31. The system of claim 23 wherein the collection end of at least one of said optical fibers, bundled together as said target, is polished at an angle substantially perpendicular to a longitudinal axis of said optical fiber.

32. The system of claim 23 wherein the collection end of at least one of said optical fibers, bundled together as said target, is polished at an angle substantially inclined with respect to a plane perpendicular to a longitudinal axis of said optical fiber.

33. The system of claim 16 wherein at least one of the ends of said fiber optic target is treated with an optical preparation.

34. The system of claim 23 wherein at least one of the ends of at least one of said optical fibers, bundled together as said target, is treated with an optical preparation.

35. The system of claim 16 wherein said primary reflector has a numerical aperture optically matched to at least one characteristic of said fiber optic target.

36. The system of claim 16 wherein said light source, said primary reflector and said fiber optic target are optically matched.

37. The system of claim 16, wherein said radii of curvature of said toroidal reflecting surface comprise lengths of 50.0 mm and 51.9 mm.

38. The system of claim 16 wherein the collection end of the optical fiber target is polished at an angle selected to compensate for astigmatism introduced by the envelope of the light source and by the toroidal reflecting surface.

39. The system of claim 16 wherein the collection end of the optical fiber target is polished at an angle selected to adjust the relative numerical aperture of the fiber to match the relative numerical aperture of the source and reflecting surface.

40. The system of claim 16 wherein the collection end of the optical fiber target is polished at an angle selected to maximize the amount of light coupled into the optical fiber.

41. The system of claim 16 wherein a numerical aperture of the optical fiber target is less than a numerical aperture of the source and reflector and wherein the optical fiber target is offset from the image point of the reflector.

42. The system of claim 16 wherein the toroidal reflecting surface is tilted at an angle relative to a plane containing the source, the target and the optical axis of the reflector to increase the flux density at a target location.

43. The system of claim 16 wherein the envelope of the source has a longitudinal axis and wherein the longitudinal axis of the envelope is tilted relative to a perpendicular to a plane containing the target, the source and the optical axis of the reflector to increase the flux density at the target.

* * * * *

UNITED STATES PATENT AND TRADEMARK OFFICE
CERTIFICATE OF CORRECTION

PATENT NO. : 5,430,634
DATED : July 4, 1995
INVENTOR(S) : Baker et al.

It is certified that error appears in the above-identified patent and that said Letters Patent is hereby corrected as shown below:

In column 5 at line 25 change "$Y_O$," to --$y_O$,--.

In column 6 at line 59 change "source, In" to --source. In--.

Signed and Sealed this

Twelfth Day of March, 1996

Attest:

BRUCE LEHMAN

*Attesting Officer*  *Commissioner of Patents and Trademarks*